(12) United States Patent
Hwang et al.

(10) Patent No.: US 9,312,551 B1
(45) Date of Patent: Apr. 12, 2016

(54) PASSIVE ANODE GAS RECOVERY SYSTEM FOR FUEL CELL

(71) Applicant: NATIONAL UNIVERSITY OF TAINAN, Tainan (TW)

(72) Inventors: Jenn-Jiang Hwang, Tainan (TW); Chun-Yuan Chang, Tainan (TW); Yen-Hsun Lu, Tainan (TW); Jenn-Kun Kuo, Tainan (TW)

(73) Assignee: National University of Tainan, Tainan (TW)

( * ) Notice: Subject to any disclaimer, the term of this patent is extended or adjusted under 35 U.S.C. 154(b) by 73 days.

(21) Appl. No.: 14/503,607

(22) Filed: Oct. 1, 2014

(51) Int. Cl.
*H01M 8/04* (2006.01)
*H01M 8/10* (2006.01)

(52) U.S. Cl.
CPC ........ *H01M 8/04104* (2013.01); *H01M 8/1018* (2013.01); *H01M 2008/1095* (2013.01)

(58) Field of Classification Search
CPC ..................... H01M 8/04007; H01M 8/04373; H01M 8/04059; H01M 8/04097
See application file for complete search history.

(56) References Cited

U.S. PATENT DOCUMENTS

| 2007/0044657 | A1* | 3/2007 | LaVen | ................. | B01D 53/047 95/96 |
| 2009/0004516 | A1* | 1/2009 | Bai | ......................... | C01B 3/384 429/436 |
| 2013/0202979 | A1* | 8/2013 | Katano | ............. | H01M 8/04761 429/444 |

\* cited by examiner

*Primary Examiner* — Stewart Fraser
*Assistant Examiner* — Olatunji Godo
(74) *Attorney, Agent, or Firm* — Rosenberg, Klein & Lee

(57) ABSTRACT

A passive anode gas recovery system for fuel cells is revealed. The system includes a fuel cell, a fuel supply device, an electronically controlled regulator, a first ejection module, a second ejection module, a hydrogen recovery module, and a controller. The system is a passive fuel recovery system disposed on an outlet end of an anode of the fuel cell. By the controller, the hydrogen recovery module recovers unconsumed hydrogen gas in the fuel cell provided by the fuel supply device into two ejection modules with different orifice diameters for recycling and reuse. The system has advantages of low cost, no extra energy consumed, and no external controller required. The system can be applied to developing fuel cell systems with high efficiency and low cost.

4 Claims, 3 Drawing Sheets

PASSIVE ANODE GAS RECOVERY SYSTEM FOR FUEL CELL

BACKGROUND OF THE INVENTION

1. Fields of the Invention

The present invention relates to a passive anode gas recovery system for fuel cells, especially to a passive fuel recovery system arranged at an outlet end of an anode of a fuel cell that recovers unconsumed hydrogen gas in the fuel cell for recycling and reuse. The passive fuel recovery system of the fuel cell has high efficiency and low cost.

2. Descriptions of Related Art

In order to provide current the load required, hydrogen gas more than the anode of fuel cells required is supplied. Thus a part of hydrogen gas unconsumed needs to be exhausted. However, once being exhausted to the atmosphere, there is a risk of explosion due to combustion reaction of the hydrogen gas. Thus the residual hydrogen gas must be recovered during operation of the fuel cell. In most of the fuel cells available now, active devices such as pumps are added for recycling of the hydrogen gas. Yet the pump added consumes more power. An extra controller is required for the system. This causes increasing of the cost and the volume of the system is larger. In order to solve the problem mentioned above, some research uses certain structure such as ejectors for hydrogen recovery of fuel cells. The two ejectors are connected to form a large-scale ejector for recycling and reuse of hydrogen gas not reacted. Yet the recovery efficiency is low due to insufficient vacuum in the ejector caused by the larger air chamber in the ejector. In order to overcome these shortcomings, there is a need to provide a novel recovery system for fuel cells with advantages of compact volume, light weight and low cost.

SUMMARY OF THE INVENTION

Therefore it is a primary object of the present invention to provide a passive anode gas recovery system for fuel cells that includes a passive fuel recovery system disposed on an outlet end of an anode of a fuel cell and used for effective recycling and reuse of unconsumed hydrogen fuel in the fuel cell. In combination with features of PEMFC that has high energy density and provides power required along with changes of load power, the recycling system for fuel cells achieves higher efficiency with lower cost.

In order to achieve the above object, the present invention provides a passive anode gas recovery system for fuel cells in which a fuel recovery system is arranged at an anode of a fuel cell and is used for recycling and reusing unconsumed hydrogen fuel in the fuel cell effectively. The passive anode gas recovery system for fuel cells includes a fuel cell, a fuel supply device, an electronically controlled regulator, a first ejection module, a second ejection module, a hydrogen recovery module, and a controller. In the fuel cell, a fuel input end and a fuel output end are disposed on an anode. The fuel supply device is connected to an electronically controlled regulator and is used for storage of hydrogen gas the fuel cell required. The pressure of the hydrogen gas is regulated by the electronically controlled regulator and then the hydrogen gas is output. The first ejection module is composed of a first solenoid valve, a first ejector and a first hydrogen gas flow meter. One end of the first ejection module is used to receive the hydrogen gas output from the fuel supply device and with the pressure regulated by the electronically controlled regulator. The first solenoid valve allows the hydrogen gas entering the first ejector to be pressured. Then the hydrogen gas passes through the other end of the first ejection module and enters the fuel input end to be used by the fuel cell. The first hydrogen gas flow meter is connected to the first ejector for monitoring flow rate of the hydrogen gas output from the first ejector. The second ejection module is connected to the first ejection module in parallel. The second ejection module is formed by a second solenoid valve, a second ejector and a second hydrogen gas flow meter. The hydrogen recovery module includes a third hydrogen gas flow meter and a fourth hydrogen gas flow meter. One end of the third hydrogen gas flow meter and one end of the fourth hydrogen gas flow meter are connected to the fuel output end of the fuel cell while the other end thereof are respectively connected to the first ejector and the second ejector for monitoring flow rate of the recovered hydrogen gas. The controller is connected to the fuel supply device and used for receiving parameters output from the first hydrogen gas flow meter, the second hydrogen gas flow meter, the third hydrogen gas flow meter, and the fourth hydrogen gas flow meter. According to the parameters received, the system judges the hydrogen gas should be recovered into the first ejector or the second ejector by the hydrogen recovery module for recycling and reuse. The first ejector and the second ejector respectively have a plurality of orifices having different diameters and made from electrochromic materials. The controller provides proper current for adjustment of the orifice diameter.

The fuel cell is a proton exchange membrane fuel cell (PEMFC).

The pressure of the hydrogen gas output from the fuel supply device is regulated by the electronically controlled regulator to be ranging from 1 bar to 10 bar. Then the hydrogen gas is used by the first ejector and the second ejector.

The first ejector and the second ejector respectively have orifices with six different diameters ranging from 0.5 mm to 2 mm. It should be noted that the orifice diameters mentioned above are only some embodiments of the present invention, not intended to limit the scope of the present invention. People skilled in the related art know that the amount of the recovered hydrogen gas of the fuel cell 1 varies according to the orifice diameter of the ejector.

Thereby the passive ejector of the present invention is used to replace conventional active mechanical pump for hydrogen recycling and having advantages of low cost, no extra energy consumption, no external control device required, compact volume, light weight, maintenance free etc. The present invention can be applied to developing a fuel cell systems with high efficiency and low cost. This is beneficial to development of industries such as fuel cell electric vehicle, fuel cell generator, etc. Moreover, the ejector compresses hydrogen gas provided to the fuel cell by potential energy and sucks unused hydrogen gas. Such operation requires no electricity or energy input of mechanical shaft. Thus the mass of the equipment is reduced and the reliability is improved. And the problem of conventional mechanical pump for hydrogen recycling is solved. Two ejectors are used in the present invention for hydrogen recovery. Thus the ejectors are easy to be replaced and the cost can be effectively controlled. Furthermore, the orifice of the ejector is made from electrochromic material. The controller supplies proper current for adjustment of the ejector orifice diameter according to system requirements. The power range of the fuel cell is adjusted by the changes of the ejector orifice diameter in real time manner. The wider the operation range of the power is, the higher the recovery efficiency the fuel cell has. The conventional ejector has the shortcoming of poor recovery efficiency. The present invention has precise and stable supply of hydrogen fuel by potential energy of the high pressure steel cylinder and the design of hydrogen gas flow meter to compensate the loss caused by low recovery efficiency of the ejector. In addition, the system of the present invention features on quick starting due to the proton exchange membrane fuel cell with low working temperature used. And the system has advantages of high reliability, long service life, strong environmental adaptability and low cost because it has high energy density and provides power required according to changes of load power.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
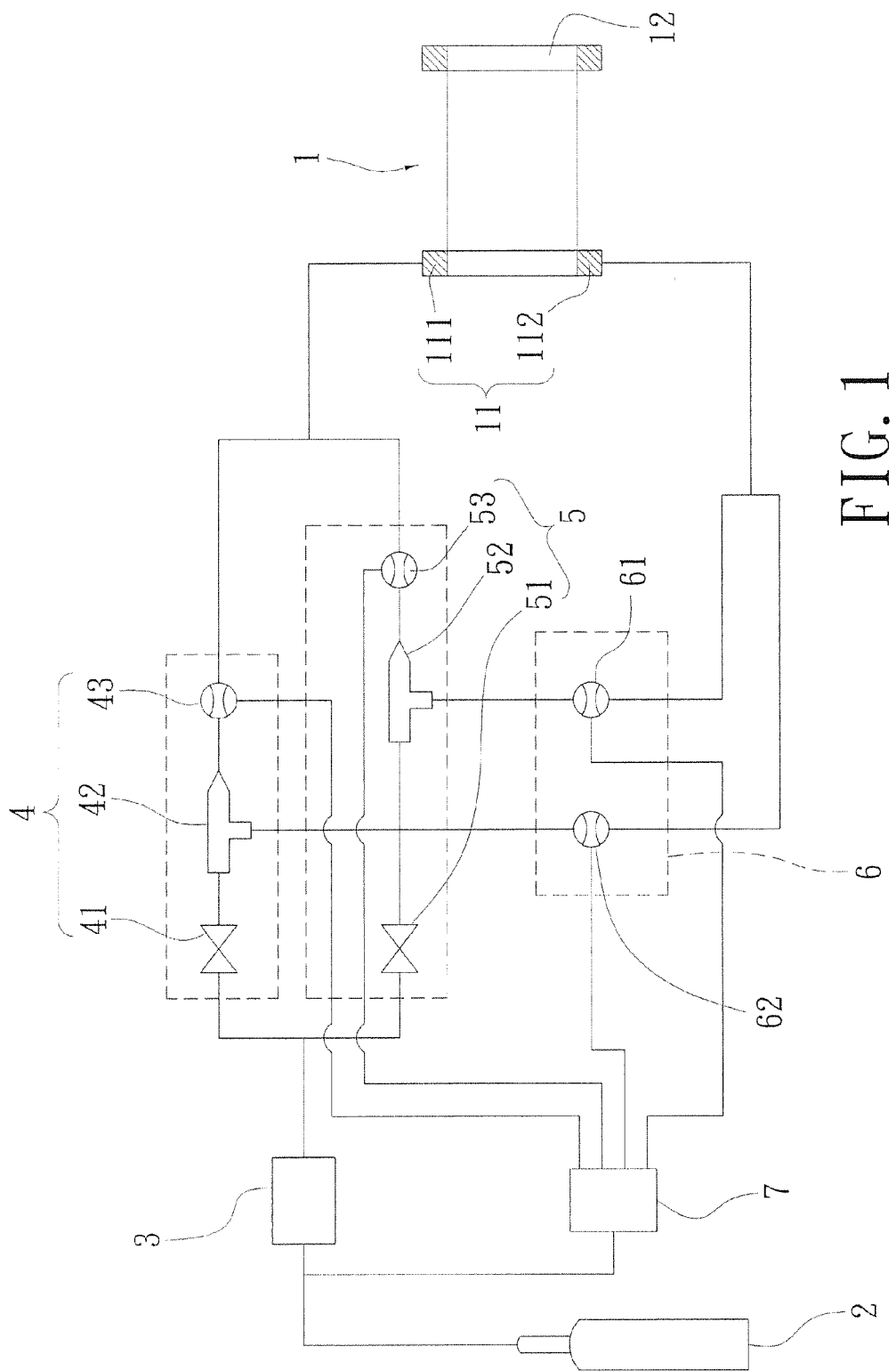
FIG. 1 is a schematic drawing showing structure of an embodiment of a passive anode gas recovery system for fuel cells according to the present invention.

Refer to FIG. 1, a schematic drawing showing structure of an embodiment of a passive anode gas recovery system used for fuel cells for effective recycling and reuse of hydrogen gas not reacted according to the present invention is revealed. The passive anode gas recovery system for fuel cells includes at least one fuel cell 1, a fuel supply device 2, an electronically controlled regulator 3, a first ejection module 4, a second ejection module 5, a hydrogen recovery module 6, and a controller 7.

The fuel cell 1 includes a fuel input end 111 and a fuel output end 112, both disposed on an anode 11 thereof. The fuel cell 1 is a proton exchange membrane fuel cell with features of simple structure, easy operation, low working temperature, quick starting, no electrolyte loss, and excellent high current discharge performance has become the focus of research and development of the fuel cell 1. Hydrogen gas and oxygen gas are respectively delivered to the anode 11 and a cathode 12. Hydrogen gas is split into hydrogen ions and electrons by a catalyst at the anode 11. The hydrogen ions are passed electrolytes and conducted to the cathode 12 while the electrons travel along an external circuit to the cathode 12. On a catalyst layer of the cathode 12, oxygen molecules react with the electrons and protons to form water, which flows out of the cell along with gas at the cathode 12. Due to low temperature operation of the PEMFC ranging about 60□~80□, the fuel cell starts up quickly. Moreover, PEMFC has high energy density and provides power required according to changes of load power. Thus it's a leading candidate for replacement of conventional chargeable batteries and is applied to vehicles, buildings or portable devices. Along with the increasing applications, PEMFC has been developed along with high power, high reliability, long service life, good environmental adaptation, low cost, etc. The trend is more obvious in car fuel cells.

The fuel supply device 2 is connected to an electronically controlled regulator 3 and is used for storage of hydrogen gas the fuel cell 1 required. The pressure of the hydrogen gas is regulated by the electronically controlled regulator 3 and then the hydrogen gas is output. In a preferred embodiment, a high pressure steel cylinder is used as the fuel supply device 2. The high pressure steel cylinder is commonly used to store hydrogen gas. After the pressure being reduced by the electronically controlled regulator 3, hydrogen gas is directly input into the fuel cell 1. When the hydrogen gas is delivered into the fuel cell 1, the pressure is increased a bit to ensure that the hydrogen gas is distributed over active area of the membrane inside the fuel cell 1. The pressure should not be too high otherwise flow field plates and the proton exchange membrane may be damaged. Thus the pressure of the gas is reduced by the electronically controlled regulator 3 and then the gas is delivered into the fuel cell 1 to have reactions. As to hydrogen gas unconsumed, it is recovered by a recovery system. There is limited volume of hydrogen gas within the high pressure steel cylinder. Once the hydrogen gas can be recovered, the service life of the high pressure steel cylinder can be increased. Moreover, the electronically controlled regulator 3 features on two micro solenoid valves combined with software and hardware of driving circuit with multi-pulse width modulation (M-PWM). Pressure feedback technique is applied to precisely control the pilot pressure of the designed valve and further control the force that drives the main valve shaft for regulation of the pressure at the outlet end of the valve.

In a preferred embodiment, the pressure of the hydrogen gas output from the fuel supply device 2 and regulated by the electronically controlled regulator 3 is ranging from 1 bar to 10 bar and the hydrogen gas is used by the following ejectors.

Figure 2:
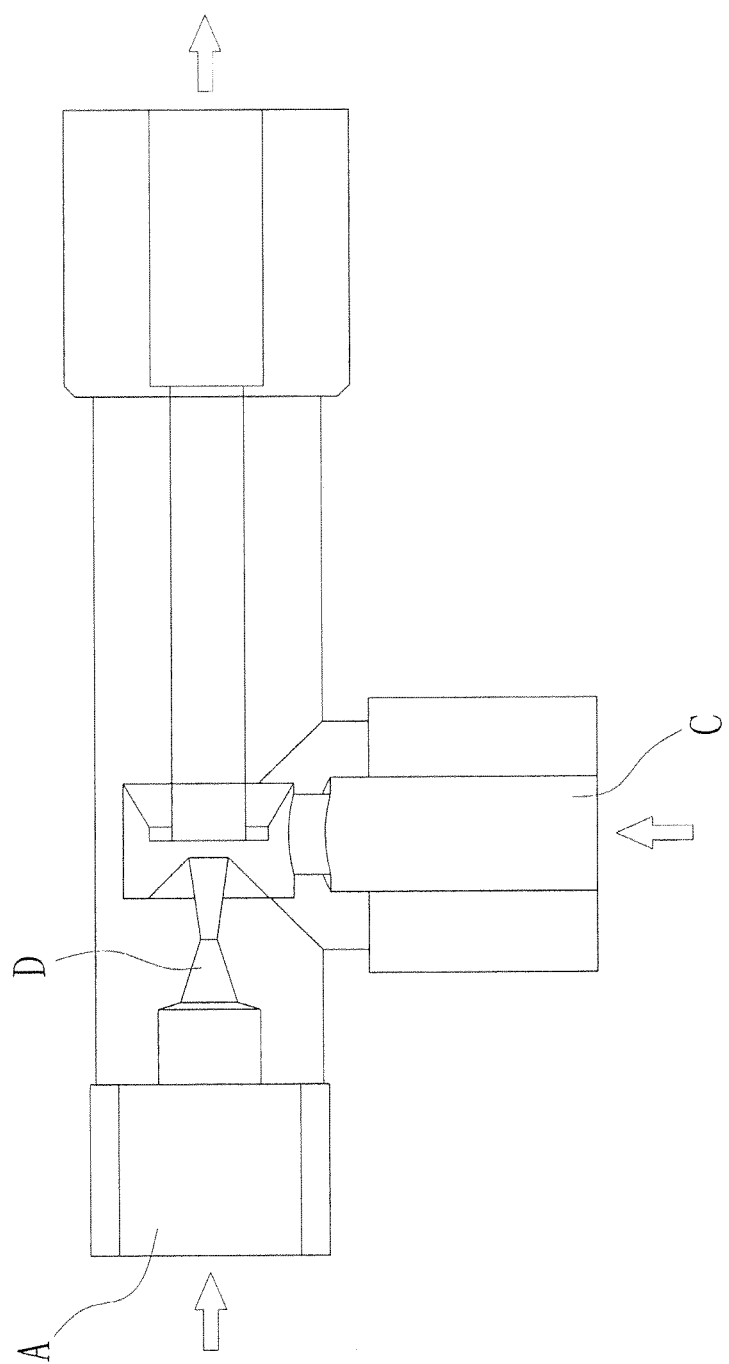
FIG. 2 is a schematic drawing showing cross section of an ejector of an embodiment according to the present invention.

The first ejection module 4 consists of a first solenoid valve 41, a first ejector 42 and a first hydrogen gas flow meter 43. One end of the first ejection module 4 is used to receive the hydrogen gas output from the fuel supply device 2 and with the pressure regulated by the electronically controlled regulator 3. The first solenoid valve 41 allows the hydrogen gas entering the first ejector 42 to be pressured. Then the hydrogen gas passes through the other end of the first ejection module 4 and enters the fuel input end 111 to be used by the fuel cell 1. The first hydrogen gas flow meter 43 is connected to the first ejector 42 for monitoring flow rate of the hydrogen gas output from the first ejector 42. The first ejector 42 can be a Venturi Vacuum Pump. No extra power is consumed and no additional control system is required. The ejector has simple structure and many advantages such as small volume, light weight, no maintenance, and low cost. Thus the ejector has been applied to industrial fields such as production and maintenance of vacuum state, low pressure vapor returning, etc. The ejector is mainly composed of a nozzle, a venture, a diffuser and a suction chamber. Energy and mass exchange between working fluid and driven fluid occurs in a mixing chamber. The speed of the working is decreased while the driven fluid is increased. The speed of the two kinds of fluid gradually becomes uniform at an outlet of the mixing chamber. While the mixed fluid passes through the diffuser, a part of kinetic energy is converted into pressure. The mixed fluid is output after being pressurized. The mixed fluid can be vapor phase, liquid phase, or a mixture of gas and fluid. The medium passed the nozzle is called working medium. The working medium fluid and the driven medium fluid are introduced into the mixing chamber for balancing the speed, generally along with the increasing of the pressure. The pressure of the fluid flowing from the mixing chamber to the diffuser keeps increasing. At the outlet of the diffuser, the pressure of the mixed fluid is larger than the pressure of the driven fluid entering a receiving chamber. Thus the main function of the ejector is to increase pressure of the driven fluid without consuming mechanical energy directly. Refer to FIG. 2, a cross section of the ejector is revealed. When hydrogen gas flows through an inlet (A) of the ejector and arrives a narrow nozzle (D), according to Law of conservation of mass:

$$\dot{m}_A = \dot{m}_D,$$

wherein ṁ is the mass flow rate; and $$\dot{m} = \rho A V,$$

wherein ρ is the gas density, A is the cross-sectional area, and V is the average velocity of the fluid; the fluid is considered as incompressible during the flowing process so that ρ can be neglected.

$$A_A V_A = A_D V_D,$$

wherein $A_A \gg A_D$ because the diameter of the nozzle (D) is much more smaller than the diameter of the inlet (A); thus $$V_D \gg V_A,$$

according to Bernoulli's Principle:

$$P_A + \frac{1}{2}\rho V_A + \rho g h_A = P_D + \frac{1}{2}\rho V_D + \rho g h_D,$$

wherein P is the pressure, g is the gravity, h is the height; the inlet (A) and the nozzle (D) are considered at the same horizontal level so that $h_A = h_D$, $$P_A + \frac{1}{2}\rho V_A = P_D + \frac{1}{2}\rho V_D,$$

thus $P_A \gg P_D$,
wherein $P_A$ is the input pressure;
when the fluid flows to the nozzle (D), the pressure generated $P_D$ is much smaller than the input pressure $P_A$. The gas moves form high pressure area to low pressure area. Thus a suction force is generated at a suction inlet (C) when $P_D$ is smaller than a fixed value so as to recover the hydrogen gas to the ejector. Moreover, the suction force the ejector generated enables hydrogen gas to carry water out. Then the water is removed by liquid gas separation.

The second ejection module 5 is connected to the first ejection module 4 in parallel. The second ejection module 5 is formed by a second solenoid valve 51, a second ejector 52 and a second hydrogen gas flow meter 53. The orifice diameter of the first ejector 42 and the second ejector 52 is ranging from 0.5 mm to 2 mm. In a preferred embodiment of the present invention, six ejectors with the orifice diameter of 0.5 mm, 0.7 mm, 1 mm, 1.3 mm, 1.5 mm, and 2 mm respectively are used for compressing hydrogen gas. The ejectors with the orifice diameter of 0.5 mm and 0.7 mm are small-orifice-diameter ejectors. In case of smaller orifice diameter, the ejector has smaller flow rate compared with other ejectors. Thus the corresponding power/watt is also limited. This is the shortcoming of ejectors with smaller orifice diameter. Yet the recovery flow rate of the small-orifice-diameter ejector is larger than the inlet flow rate. The small-orifice-diameter ejector has higher recovery efficiency. Moreover, the ejectors with orifice diameter of 1 mm, 1.3 mm, 1.5 mm, and 2 mm are large-orifice-diameter ejectors. Thus the corresponding flow rate is larger and the power is increased and having larger wattage range. But compared with ejectors with small orifice diameter, the large-orifice-diameter ejectors have lower recovery flow rate and poor recovery efficiency. It should be noted that the orifice diameters mentioned above are only some embodiments of the present invention, not intended to limit the scope of the present invention. People skilled in the related art know that the amount of the recovered hydrogen gas of the fuel cell 1 varies according to the orifice diameter of the ejector.

The hydrogen recovery module 6 includes a third hydrogen gas flow meter 61 and a fourth hydrogen gas flow meter 62. One end of the third hydrogen gas flow meter 61 and one end of the fourth hydrogen gas flow meter 62 are connected to the fuel output end 112 of the fuel cell 1 while the other end thereof are respectively connected to the first ejector 42 and the second ejector 52 for monitoring flow rate of the recovered hydrogen gas.

The controller 7 is connected to the fuel supply device 2 and used for receiving parameters output from the first hydrogen gas flow meter 43, the second hydrogen gas flow meter 53, the third hydrogen gas flow meter 61, and the fourth hydrogen gas flow meter 62. According to the parameters received, the system checks that the hydrogen gas should be recovered to the first ejector 42 or the second ejector 52 by the hydrogen recovery module for recycling and reuse. The first ejector 42 and the second ejector 52 respectively have a plurality of orifices having different diameters and made from electrochromic materials. The controller 7 provides proper current for adjustment of the orifice diameter.

In the present invention, a fuel recovery system is disposed on the anode 11 of the fuel cell 1 by experimental design method and related experiments are carried out. LabVIEW graphical programming platform is used for system control and measuring experiment data. Then CFD-RC simulated software based on the multi-step finite volume method is used to carry out multi-physics coupling simulation according to structure and environment of the experiment system. The Mathematical Model and system control method related to the recovery mechanism are further discussed. At last, design and develop an ideal passive recovery system according to the fuel recovery efficiency the PEMFC required. And the recovery system is integrated into the fuel cell 1 to form a complete system of the fuel cell 1. Due to complicated structure, expensive instrument, and risk of the hydrogen system, hydrogen gas is replaced by air the in beginning of the research to construct a gas recovery system for the fuel cell 1. Next the relation between air flow rate and flow rate of hydrogen gas is calculated by Reynolds number formula. Thus the performance of hydrogen gas in the ejector recovery system can be learned.

Figure 3:
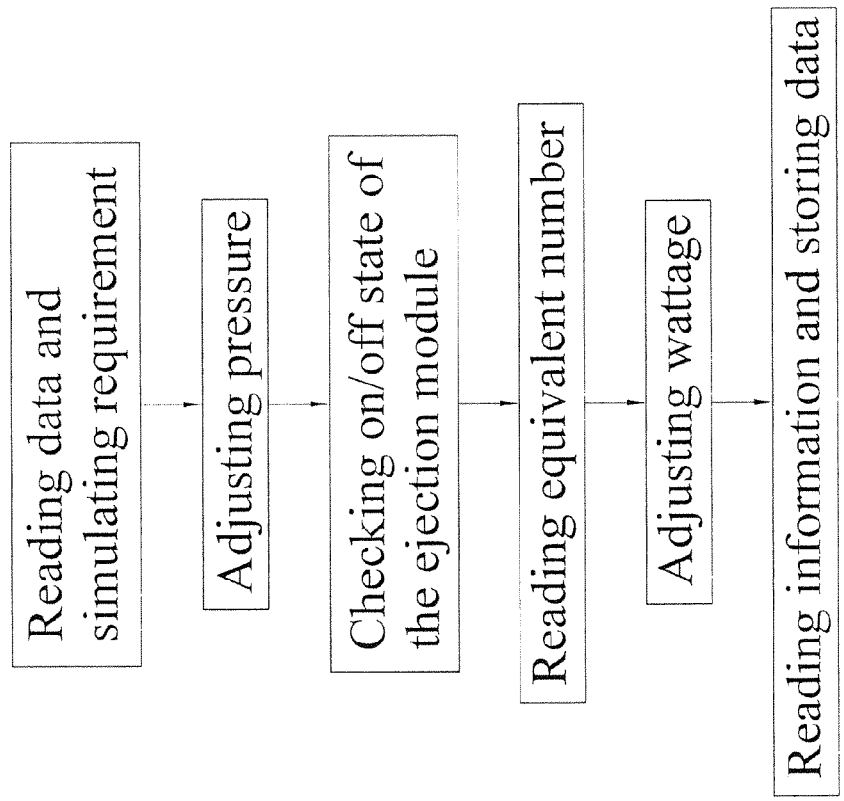
FIG. 3 is a flow chart showing steps of an embodiment according to the present invention.

Refer to FIG. 3, a flow chart showing steps of an embodiment of the present invention is disclosed.

A. Reading Data and Simulating Requirement:
The fuel cell 1 reads data used and generates satisfaction-power figure (S-P figure) to simulate the amount of hydrogen gas the fuel cell 1 required.

B. Adjusting Pressure:
The fuel cell 1 sends a command to the electronically controlled regulator 3 for pressure adjustment. A Proportional-Integral-Derivative (PID) controller is used to reach a reference value of S-P figure. PID controller is a control loop feedback mechanism widely used in industrial control system. The data collected is compared with a reference value by the PID controller. Then a difference therebetween is used to calculate a new input value. The new input value is used to make the data of the system reach or maintain at the reference value. PID controller can adjust the input value based on historical data and occurrence frequency of the difference so as to make the system work/operate more precisely and stably.

C. Checking on/Off State of the Ejection Module:
The first solenoid valve 41 disposed on the first ejection module 4 controls whether the hydrogen gas enters the first ejection module 4 or not. There are four combinations when the first solenoid valve 41 disposed on the first ejection module 4 is used together with the second solenoid valve 51 of the second ejection module 5. The first combination is that both solenoid valves 41, 51 are off. In the second combination, both solenoid valves 41, 51 are on. In the third combination, the first solenoid valve 41 is off while the second solenoid valve 51 is on. In the fourth combination, the first solenoid valve 41 is on while the second solenoid valve 51 is off.

D. Reading Equivalent Number:

Read the equivalent number of the fuel cell 1. The equivalent number is divided by the value of 2. When the equivalent number is smaller than 2, the first solenoid valve 41 is off while the second solenoid valve 51 is on. And the system uses the second ejection module 5 with larger orifice diameter and worse recovery efficiency as the main device to recover hydrogen gas. When the equivalent number is larger than 2, the first solenoid valve 41 is pulsed while the second solenoid valve 51 is on. The system activates the first ejection module 4 having smaller orifice diameter for hydrogen recovery and having higher recovery efficiency.

E. Adjusting Wattage:

The pressure is adjusted by electrically-controlled regulator 3. Use PID program to make the pressure become consistent with the reference value of S-P figure.

F. Reading Information and Storing Data:

Read program flow by all sensors. If there is a problem, the program turns the flow back to the process B, the step of adjusting pressure. The pressure is regulated by the electronically-controlled regulator 3 and the reference value of the S-P figure is reached by the PID controller. Once the sensors check that there is no problem, record and store data related. The recovery of hydrogen gas is completed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A passive anode gas recovery system for fuel cells disposed on an anode of a fuel cell for effectively recycling and reuse of hydrogen gas not reacted comprising:
    a fuel cell having a fuel input end and a fuel output end disposed on an anode thereof;
    a fuel supply device used for storage of hydrogen gas the fuel cell required;
    an electronically controlled regulator that is connected to the fuel supply device and is used for regulating a pressure of the hydrogen gas from the fuel supply device and outputting the hydrogen gas;
    a first ejection module having a first solenoid valve, a first ejector and a first hydrogen gas flow meter; one end of the first ejection module receiving the hydrogen gas that comes from the fuel supply device and having the pressure regulated by the electronically controlled regulator; the first solenoid valve allowing the hydrogen gas entering the first ejector to be pressured and then the hydrogen gas passing through the other end of the first ejection module and the fuel input end to be used by the fuel cell; the first hydrogen gas flow meter connected to the first ejector for monitoring flow rate of the hydrogen gas output (by) from the first ejector;
    a second ejection module connected to the first ejection module in parallel and including a second solenoid valve, a second ejector and a second hydrogen gas flow meter;
    a hydrogen recovery module that includes a third hydrogen gas flow meter and a fourth hydrogen gas flow meter; one end of the third hydrogen gas flow meter and one end of the fourth hydrogen gas flow meter are connected to the fuel output end of the fuel cell while the other end of the fourth hydrogen gas flow meter and the other end of the third hydrogen gas flow meter are respectively connected to the first ejector and the second ejector for monitoring flow rate of the hydrogen gas recovered; and
    a controller connected to the fuel supply device and used for receiving parameters output from the first hydrogen gas flow meter, the second hydrogen gas flow meter, the third hydrogen gas flow meter, and the fourth hydrogen gas flow meter to judge the hydrogen gas should be recovered to the first ejector or the second ejector by the hydrogen recovery module for recycling and reuse; the first ejector and the second ejector respectively having a plurality of orifices with different diameters and made from electrochromic materials; the controller provides proper current for adjustment of the diameter of the orifice.

2. The system as claimed in claim 1, wherein the fuel cell is a proton exchange membrane fuel cell (PEMFC).

3. The system as claimed in claim 1, wherein the electronically controlled regulator is used for regulating a pressure of the hydrogen gas from the fuel supply device to ranging from 1 bar to 10 bar and the hydrogen gas is used by the first ejector and the second ejector.

4. The system as claimed in claim 1, wherein the first ejector and the second ejector respectively have six orifice diameters each of which is ranging from 0.5 mm to 2 mm.

* * * * *